Patented May 29, 1934

1,960,540

UNITED STATES PATENT OFFICE 1,960,540

HALOGENATED DIBENZANTHRONES

Max Albert Kunz, Mannheim, and Karl Koeberle and Erich Berthold, Ludwigshafen-on-the-Rhine, Germany, assignors to General Aniline Works, Inc., New York, N. Y., a corporation of Delaware No Drawing. Application July 19, 1930, Serial No. 469,284. In Germany July 26, 1929

7 Claims. (Cl. 260—61)

The present invention relates to the production of dibenzanthrones and isodibenzanthrones containing two different halogens.

We have found that mixed halogenated dibenzanthrones and isodibenzanthrones are readily obtained by treating a halogenated dibenzanthrone which expression is meant to also comprise halogenated isodibenzanthrone and derivatives of the said dibenzanthrones, with a halogen, viz. chlorine or bromine, different from that contained in the initial material, or an agent supplying such halogen free from a metallic component, in an organic dissolving or suspending medium. As solvents or diluting agents may be mentioned nitrobenzene, trichlorbenzene, dichlorbenzene, acetic anhydride, quinoline and the like. Particularly good results are obtained by halogenation in nitrobenzene.

Halogenating agents comprise, for example, sulphuryl chloride, sulphur chloride, thionyl chloride, phosphorus penta- and trichloride, phosphorus oxychloride and phosphorus tribromide. The halogenated initial material comprising iodo derivatives may be prepared according to any method hitherto proposed, for example by halogenation of a dibenzanthrone in an inorganic medium, for example in sulphuric acid or a derivative thereof, such as oleum and chlorsulphonic acid, or in water which may have neutral, acid or alkaline reaction, or in a melt of a metal halide or by means of a metal halide. The initial material may also be produced in an organic dissolving or suspending medium. In the latter case the production of a dibenzanthrone containing two different halogens may be carried out in the same medium, or by the simultaneous action of two different halogens or agents supplying such halogens or both a halogen and such agent.

The manner of working described also allows of partially replacing the halogen present in halogenated dibenzanthrones or isodibenzanthrones by another halogen, or also of replacing other substituents in derivatives, such as nitro and sulpho groups wholly or partly by halogen. The halogenation is preferably carried out in the presence of halogen transferrers. Particularly valuable dyestuffs produced according to our invention are those dyestuffs containing chlorine and bromine in which chlorine prevails whereby it is not necessary that the dyestuffs are quite uniformly halogenated dibenzanthrones but they may consist of a mixture of differently halogenated dibenzanthrones containing a higher average percentage of chlorine than of bromine.

The dyestuffs are obtained in very good yields and in a state of great purity, but they may be purified if desired according to the usual methods as for example by crystallization, by conversion into the oxonium salts as for example the oxonium sulphates, or by treatment with oxidizing agents as for example in the form of their aqueous pastes with alkali metal or alkaline earth metal hypochlorites. The initial materials as well as the working conditions may be varied within wide limits.

The following examples will further illustrate the nature of this invention, but the invention is not restricted to these examples. The parts are by weight.

Example 1

40 parts of sulphuryl chloride are allowed to run slowly at 60° C. in the course of 2 hours into a suspension of 46 parts of dibenzanthrone and 1 part of iodine in 500 parts of nitrobenzene and the reaction mixture is kept at the same temperature for another 2 hours. After the addition of 1 part of iron, 40 parts of bromine are added at 160° C. and the mixture is stirred for 3 hours. The reaction mixture may be worked up either by steam distillation or by filtration by suction. The dyestuff containing chlorine and bromine thus obtained as a violet powder dissolves in concentrated sulphuric acid giving a violet colouration and yields powerful, dark blue dyeings on cotton from a blue vat.

Example 2

46 parts of isodibenzanthrone are suspended in 500 parts of nitrobenzene and are treated with sulphuryl chloride and bromine as described in Example 1. The chlorobromoisodibenzanthrone thus obtained dissolves in concentrated sulphuric acid giving a green colouration and dyes the vegetable fibre fast, brilliant, bluish violet shades from a violet blue vat.

A product having the same tinctorial properties is obtained by bromination of dichloroisodibenzanthrone, such as is obtainable by chlorinating isodibenzanthrone in nitrobenzene by means of chlorine or sulphuryl chloride, in nitrobenzene as described in Example 1.

Example 3

20 parts of dibromodibenzanthrone, prepared by brominating dibenzanthrone in chlorsulphonic acid in the presence of antimony or iron at 40° C., are heated to between 140° and 150° C. while stirring in 200 parts of trichlorbenzene and are treated at this temperature with chlorine until a sample dyes cotton from a blue vat clear navy blue shades. The working up is carried out in the usual manner. A blue violet powder is thus obtained, according to analysis approximately a monobromodichlorodibenzanthrone, which dissolves in concentrated sulphuric acid giving a violet colouration and which yields powerful navy blue dyeings which are practically fast to drops of water and insensitive to temperature, on cotton from a blue vat.

A similar dyestuff is obtained in the same manner by starting with a bromdibenzanthrone obtainable by bromination of dibenzanthrone in nitrobenzene at 160° C. in the presence of iodine. The bromination and the chlorination may also be carried out in one operation with the same result.

Example 4

20 parts of dibromodibenzanthrone, obtainable as described in Example 3, are treated, as described in Example 1, in nitrobenzene at 60° C. after the addition of 1 part of iodine with 40 parts of sulphuryl chloride while stirring. The whole is worked up in the usual manner by expelling the nitrobenzene with steam or by distilling off the excess of nitrobenzene with or without the employment of reduced pressure. The dyestuff thus obtained, which is a blue violet powder, dissolves in concentrated sulphuric acid giving a blue violet colouration and dyes cotton fast navy blue shades from a blue vat. According to analysis it corresponds approximately to a dibromotrichlorodibenzanthrone.

By alteration of the amount of sulphuryl chloride employed and of the temperature, chlorobromodibenzanthrones containing various proportions of the constituents chlorine and bromine may be obtained.

Example 5

Chlorine is led at between 140° and 150° C. into a suspension in 200 parts of trichlorbenzene of 20 parts of tribromodibenzanthrone, prepared by bromination of dibenzanthrone in chlorsulphonic acid in the presence of antimony, until a sample dyes cotton from a blue vat navy blue shades and the halogen content corresponds to that of a trichlormonobrom derivative. After cooling the reaction mixture is worked up in the usual manner. The dyestuff thus obtained, which is a reddish blue powder, dissolves in concentrated sulphuric acid giving a violet colouration and yields clear, fast, navy blue dyeings having good fastness to drops of water on cotton.

Example 6

1.2 parts of iodine and 50 parts of sulphuryl chloride are added at 60° C. to 25 parts of nitrodibenzanthrone, obtainable by treating dibenzanthrone in nitrobenzene with concentrated nitric acid at between 0° and 20° C., suspended in 250 parts of nitrobenzene and the whole is kept at the same temperature for 3 hours. After the addtion of 2.5 parts of iron the temperature is raised to 160° C., 30 parts of bromine are allowed to flow in slowly and the reaction mixture is kept at the said temperature for from 3 to 4 hours. After working up in the usual manner a violet powder is obtained which dissolves in concentrated sulphuric acid giving a violet colouration and dyes cotton fast, blue grey shades from a greenish blue vat.

Example 7

25 parts of a brominated nitrodibenzanthrone obtained by the bromination of nitrodibenzanthrone in nitrobenzene at 160° C. in the presence or absence of halogen transferrers such as iron, iodine and the like and which according to analysis is a dibromo derivative, are suspended in 250 parts of trichlorbenzene and the suspension is treated for about 3 hours with chlorine at 160° C. The reaction mixture is worked up in the usual manner. The dyestuff containing chlorine and bromine thus obtained in the form of a blue powder dissolves in concentrated sulphuric acid giving a violet colouration and dyes cotton grey blue shades having good properties of fastness from a blue vat.

Example 8

200 parts of dibromodibenzanthrone, obtainable by treating dibenzanthrone in nitrobenzene at about 160° C. with bromine in the presence of iron and iodine, are heated to from 120° to 140° C. while stirring in 1000 parts of trichlorbenzene after the addition of 2 parts of iodine and 2 parts of iron. Dry chlorine gas is then led in for several hours at the same temperature and the reaction mixture allowed to cool and is then worked up in the usual manner. The reaction product containing chlorine and bromine thus obtained is a dark blue powder which dissolves in concentrated sulphuric acid giving a violet colouration; it yields a blue vat and dyes cotton therefrom navy blue shades of very good fastness especially to washing.

A dyestuff giving similar dyeings is obtained by treating the initial material with sulphuryl chloride in nitrobenzene.

Example 9

20 parts of sulphuryl chloride are added in the course of 1 hour to 20 parts of the dibromodibenzanthrone specified in Example 3, suspended in 200 parts of nitrobenzene while stirring at 60° C. after the addition of 1 part of iodine and the reaction mixture is kept at the same temperature for 1 further hour. The reaction mixture is then worked up by expelling the nitrobenzene by means of steam or by distilling it off, if desired under reduced pressure. The dyestuff thus obtained, a mono-chlorodibromodibenzanthrone according to analysis, dissolves in concentrated sulphuric acid to give a blue violet solution and dyes cotton from a blue vat fast navy blue shades.

Example 10

60 parts of sulphuryl chloride are allowed to run slowly at 75° C. in the course of 2 hours into a suspension of 46 parts of dibenzanthrone and 1 part of iodine in 500 parts of nitrobenzene and the reaction mixture is kept at the same temperature for 48 hours. After the addition of 1 part of iron, 20 parts of bromine are added at 160° C. and the mixture is stirred for 3 hours. The reaction mixture is worked up as usual. The dyestuff, a trichloro-mono-bromodibenzanthrone according to analysis, is a violet powder, dissolves in concentrated sulphuric acid giving a violet colouration and yields powerful dark blue dyeings on cotton from a blue vat.

What we claim is:—

1. A process of producing dibenzanthrones containing per molecule at least 1 atomic proportion of bromine and at least 1 atomic proportion of chlorine, which comprises treating a dibenzanthrone containing per molecule at least 1 atomic proportion of a halogen in an organic medium with a halogenating agent supplying a halogen different from that present in the initial material, selected from the group consisting of chlorine and bromine and halogenating agents furnishing one of the said halogens free from a metallic component.

2. A process of producing dibenzanthrones containing per molecule at least 1 atomic proportion of bromine and at least 1 atomic proportion of chlorine, which comprises treating a dibenzanthrone containing per molecule at least 1 atomic proportion of a halogen in an organic medium with a halogenating agent supplying a halogen different from that present in the initial material, selected from the group consisting of chlorine and bromine and halogenating agents furnishing one of the said halogens free from a metallic component, in the presence of a halogen transferrer.

3. A process of producing dibenzanthrones containing per molecule at least 1 atomic proportion of bromine and at least 1 atomic proportion of chlorine, which comprises treating a dibenzanthrone containing per molecule at least 1 atomic proportion of a halogen in nitrobenzene with a halogenating agent supplying a halogen different from that present in the initial material, selected from the group consisting of chlorine and bromine and halogenating agents furnishing one of the said halogens free from a metallic component.

4. A process of producing dibenzanthrones containing per molecule at least 1 atomic proportion of bromine and at least 1 atomic proportion of chlorine, which comprises treating a dibenzanthrone in an organic medium with a halogenating agent thereby introducing at least one atomic proportion of halogen per molecular proportion of said dibenzanthrone, and then with a halogenating agent supplying a halogen different from that first introduced selected from the group consisting of chlorine and bromine and halogenating agents furnishing one of the said halogens free from a metallic component.

5. Monobromodichlorodibenzanthrone dissolving in concentrated sulphuric acid to give a violet solution and dyeing cotton powerful navy blue shades practically fast to drops of water from a blue vat.

6. Trichloromonobromodibenzanthrone, dissolving in concentrated sulphuric acid to give a violet solution and dyeing cotton clear navy blue shades of good fastness against drops of water from a blue vat.

7. Chloro-bromodibenzanthrones containing per molecule at least 1 atomic proportion of bromine and in which more atomic proportions of chlorine than atomic proportions of bromine are present, said dyestuffs dissolving in concentrated sulphuric acid to give violet solutions and dyeing cotton blue shades of a good fastness to drops of water from blue vats.

MAX ALBERT KUNZ.
KARL KOEBERLE.
ERICH BERTHOLD.